: 2,786,846
Patented Mar. 26, 1957

2,786,846

PROCESS OF ALKYLATING PYRIDINES

Francis E. Cislak and William R. Wheeler, Indianapolis, Ind., assignors to Reilly Tar & Chemical Corporation, Indianapolis, Ind., a corporation of Indiana No Drawing. Application June 1, 1953, Serial No. 358,953

4 Claims. (Cl. 260—290)

Our present invention relates to a process of alkylating a methyl group attached at the 2-position, the 4-position, or the 6-position of a pyridine nucleus. More specifically, our invention relates to the alkylation of a methyl group of 2-picoline, 4-picoline, 2,4-lutidine, 2,5-lutidine, 2,6-lutidine, 2-methyl-5-ethylpyridine, 2-methyl-3-ethylpyridine, 2-methyl-5,6-benzopyridine, and 4-methyl-5,6-benzopyridine.

This application is a continuation-in-part of our copending application Serial Number 161,736, filed May 12, 1950, and now abandoned.

By "alkylating a methyl group" we mean converting the methyl group into an alkyl or alkenyl group having two or more carbon atoms.

The alkylation of pyridines has been investigated by many researchers. In 1942 Arens and Wibaut disclosed (Rec. trav. chim. 61, 59–68) a process of alkylating pyridine. They found that alkyl groups may be introduced into the 4-position of pyridine by the action of zinc dust on a mixture of pyridine, organic acid anhydride, and the corresponding organic acid. Thus, they prepared 4-ethylpyridine from pyridine by the action of zinc dust, acetic anhydride, and acetic acid; 4-propylpyridine was prepared by using zinc dust, propionic acid, and propionic anhydride. This reaction of Arens-Wibaut is of limited application. It can be used for the introduction of an alkyl group into the 4-position only. Furthermore, it cannot be used to introduce an alkyl group into the 4-position of 2-methylpyridine, 2-aminopyridine, picolinic acid, nor of 2-chloropyridine.

In 1950, Rieger (U. S. Pat. 2,502,174) described a process of alkylating pyridine by the use of organic salts of tetravalent lead. By this process alkyl groups containing one less carbon atom than the acid radical of the lead salt are attached to the pyridine nucleus; the alkyl group enters both the 2- and the 4-positions if those are open. Thus, treatment of pyridine with lead tetra-acetate gives a mixture of 2-picoline and 4-picoline. If the 2-positions are blocked, the entering alkyl group occupies the 4-position, thus 2,6-lutidine and lead tetra-acetate gives 2,4,6-collidine. If the 4-position is blocked, the entering alkyl group takes the 2-position; 4-picoline with lead tetra-acetate gives 2,4-lutidine. While the Rieger method is useful for the preparation of some alkylpyridines, such as 2,4-lutidine from 4-picoline, it is not a practical method for the commercial production of such alkylpyridines as 2-propylpyridine or 4-ethylpyridine.

The Russian chemist Chichibabin had developed a useful method for preparing 2- and 4-alkylpyridines from 2-picoline and 4-picoline. This method, which was published in 1936 (Bull. soc. chim. France 3, 1607–32) involves reacting a 2-picoline or a 4-picoline with sodamide and then with an alkyl halide. The method has been applied to the preparation of 2-ethylpyridine from 2-picoline and methyl chloride as well as to the preparation of long-chain alkylpyridines, such as 2-n-tridecylpyridine, from 2-picoline and n-dodecylchloride (Knight and Shaw, J. Chem. Soc. 1938, 682–3). In 1951, Brown alkylated 3-picoline by means of the Chichibabin method (Brown and Murphey, J. Amer. Chem. Soc. 73, 3308–12). The Chichibabin method is useful for the preparation of laboratory quantities of alkylpyridines but is not particularly adaptable for commercial processes. The yields are not too satisfactory, and the reagents are expensive.

Since various pyridines having a methyl group in the 2-position or the 4-position are commercially available, we undertook to develop a simple, commercially practical, method of producing alkylpyridines from the readily available 2-picolines and 4-picolines. That we were successful is clearly evident from the description of our invention given below.

We have found that we can alkylate a methyl group attached to the pyridine ring at the 2-position, or at the 4-position, or at the 6-position by mixing the methylpyridine with an aliphatic aldehyde, vaporizing the resultant mixture and passing the vapors through a suitable reactor containing a catalyst, maintained at a reacting temperature preferably between 200° C. and 550° C., and more desirably between 250° C. and 500° C. We prefer to carry out our process in a continuous manner although that is not necessary.

In accordance with our process, the alkylation of 2-methylpyridine with formaldehyde results in the formation of 2-ethylpyridine and 2-ethenylpyridine (commonly known as 2-vinylpyridine). Alkylation with acetaldehyde yields 2-propylpyridine and 2-propenylpyridine. Propionaldehyde gives 2-butylpyridine and 2-butenylpyridine in relatively poorer yields.

Since the methyl groups of 2,6-lutidine are identical, one might anticipate that each of them would react in the manner of the methyl group of 2-methylpyridine. In accordance with our process, the alkylation of 2,6-lutidine with formaldehyde results mainly in the alkylation of only one of the methyl groups. We have not isolated any dialkylation product, but it is entirely possible that a small amount was formed.

4-methylpyridine is alkylated in accordance with our process to give 4-alkylpyridines and 4-alkenylpyridines.

In the case of 2,4,6-trimethylpyridine we are presented with three methyl groups which are potentially capable of alkylation by our process. We find, however, that 2,4,6-trimethylpyridine is alkylated by formaldehyde almost exclusively in the 2-position. This is in contrast to the Chichibabin process; reacting 2,4,6-trimethylpyridine with sodamide and then with an alkyl halide results in the alkylation of the methyl group in the 4-position. Neither the Arens-Wibaut method of alkylation, nor the Rieger process will alkylate 2,4,6-trimethylpyridine.

The methyl group of 2-methyl-5-ethylpyridine may be alkylated in accordance with our process to give 2-alkyl-5-ethylpyridines and 2-alkenyl-5-ethylpyridines. We have observed no alkylation of the ethyl group in the 5-position.

In carrying out our invention, we may use various types of reactors. We prefer the fluid catalyst type, such as is normally used in carrying out cracking operations in the petroleum industry. Such reactors are of tubular form with suitable connections at entrance and exit. They are provided with means for supporting the fluid bed of catalyst and are provided with any convenient means for heating them.

We may use any of a large number of catalysts in carrying out our process, for example, we can use alumina as a catalyst; or we can use the alumina mixed with zinc fluoride.

A highly satisfactory way of carrying out our invention is described more fully by means of the following specific examples. These examples are only for purposes of illustration.

Example 1

We vaporize a mixture composed of one mole of 2-picoline and one mole of formaldehyde (the formaldehyde used is a 37% aqueous solution) and pass the vapors through a suitable reactor containing a fluidized catalytic bed of alumina (H-41) which had been impregnated with 10% zinc fluoride; the catalyst is finely divided and all of it passes through 100 mesh. The reactor is maintained at a temperature of about 275° C. The superficial velocity at which the vapors are passed through the catalyst is about 0.9 foot per second. As the mixture of 2-picoline and formaldehyde passes through the reactor, a reaction occurs whereby 2-vinylpyridine and a small amount of 2-ethylpyridine are produced. The vapors of the unchanged reactants and the reaction products are promptly taken out of the reactor and are promptly condensed, cooled, and collected in a suitable receiver.

The 2-vinylpyridine is separated from the 2-ethylpyridine and unreacted 2-picoline and formaldehyde and from the other reaction products in any suitable manner, as, for example, by fractional distillation under vacuum.

The yield of 2-vinylpyridine and its purity is high.

Example 2

The process of Example 1 is repeated with the difference that the catalyst used is alumina (H-41) upon which no zinc fluoride has been impregnated, and the temperature of the reactor is 450° C. Under these conditions, there results a high yield of 2-ethylpyridine with a smaller yield of 2-vinylpyridine. The higher temperature and the absence of zinc fluoride on the catalyst are more conducive to the formation of 2-ethylpyridine than to the formation of 2-vinylpyridine.

Example 3

The process of Example 1 is repeated with the exception that the picoline used is 4-picoline. By this process 4-vinylpyridine is produced.

Example 4

The process of Example 1 is repeated with the exception that the temperature of the reactor is 400° C. instead of the 275° C. used in Example 1. By carrying out the process in this manner, there results a mixture of 2-ethylpyridine and 2-vinylpyridine, with the 2-ethylpyridine predominating. The 2-ethylpyridine and the 2-vinylpyridine may be separated from the reaction mixture and from each other in any suitable manner as by fractional distillation under vacuum.

Example 5

The process of Example 2 is repeated with the difference that the reactor temperature is 275° C. instead of the 400° C. used in Example 2. This process yields a mixture of 2-ethylpyridine and 2-vinylpyridine, with the 2-vinylpyridine predominating. The 2-ethylpyridine and the 2-vinylpyridine can be separated from the reaction mixture and from each other by fractional distillation under vacuum.

Example 6

The process of Example 2 is repeated with the exception that the picoline used is 4-picoline. By this process 4-ethylpyridine is produced.

We have found that higher yields of alkenylpyridine as compared to alkylpyridine, are produced if the temperature of the reactor is maintained at about 250° C. to 300° C. We have also found that the ratio of alkylpyridine to alkenylpyridine is increased if the reactor temperature is maintained at about 400° C. to 550° C.

We claim as our invention:

1. The process of producing a compound of the class consisting of a 2-ethylpyridine and a 4-ethylpyridine which comprises the vapor phase reaction of a compound of the class consisting of 2-picoline, 4-picoline, alkyl-2-picoline, and alkyl-4-picoline with formaldehyde at a temperature between about 400° C. to about 550° C. in the presence of alumina catalyst and recovering the resultant ethylpyridine.

2. The process of claim 1 in which the picoline is 2-picoline.

3. The process of claim 1 in which the picoline is 4-picoline.

4. The process of alkylating a methyl group of a compound of the class consisting of 2-picoline, 4-picoline, alkyl-2-picoline, and alkyl-4-picoline which comprises the vapor phase reaction of the picoline with a lower aliphatic aldehyde at a temperature between about 400° C. to about 550° C. in the presence of an alumina catalyst and recovering the resultant alkylpicoline.

References Cited in the file of this patent

UNITED STATES PATENTS

| | | |
|---|---|---|
| 2,512,660 | Mahan | June 27, 1950 |
| 2,534,285 | Mahan | Dec. 19, 1950 |
| 2,556,845 | Kauffman | June 12, 1951 |
| 2,611,769 | Hays | Sept. 23, 1952 |
| 2,698,848 | Mahan | Jan. 4, 1955 |